United States Patent
Liu

(10) Patent No.: US 12,145,600 B2
(45) Date of Patent: Nov. 19, 2024

(54) ASSISTED DRIVING METHOD AND APPARATUS, ELECTRONIC APPARATUS, VEHICLE-MOUNTED SYSTEM, AND STORAGE MEDIUM

(71) Applicant: ZTE CORPORATION, Guangdong (CN)

(72) Inventor: Bo Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 254 days.

(21) Appl. No.: 17/922,815

(22) PCT Filed: May 20, 2021

(86) PCT No.: PCT/CN2021/094945
§ 371 (c)(1),
(2) Date: Nov. 2, 2022

(87) PCT Pub. No.: WO2021/254086
PCT Pub. Date: Dec. 23, 2021

(65) Prior Publication Data
US 2023/0166742 A1    Jun. 1, 2023

(30) Foreign Application Priority Data
Jun. 16, 2020 (CN) .......................... 202010556946.1

(51) Int. Cl.
*B60W 40/105* (2012.01)
*G01C 21/34* (2006.01)

(52) U.S. Cl.
CPC ....... *B60W 40/105* (2013.01); *G01C 21/3469* (2013.01); *B60W 2510/18* (2013.01); *B60W 2510/20* (2013.01)

(58) Field of Classification Search
CPC .............. B60W 40/105; B60W 40/09; B60W 2510/18; B60W 2510/20;
(Continued)

(56) References Cited

U.S. PATENT DOCUMENTS

| 6,353,788 B1 | 3/2002 | Baeker et al. |
| 2018/0203451 A1 | 7/2018 | Cronin et al. |

(Continued)

FOREIGN PATENT DOCUMENTS

| CN | 105590466 A | 5/2016 |
| CN | 105869412 A | 8/2016 |

(Continued)

OTHER PUBLICATIONS

Canada, Patent Office, Office action dated Apr. 11, 2024, for corresponding CA application No. 3182364.
(Continued)

*Primary Examiner* — Hai H Huynh
(74) *Attorney, Agent, or Firm* — Li & Cai Intellectual Property (USA) Office

(57) ABSTRACT

The present disclosure provides an assisted driving method, including: monitoring, in response to that a driving speed of a vehicle is less than or equal to a preset speed and a steering wheel direction is deflected within a first preset time period, an instantaneous oil consumption value of the vehicle; determining whether the instantaneous oil consumption value of the vehicle reaches a first preset reference value within a second preset time period; and sending a reminding message in response to that the instantaneous oil consumption value of the vehicle reaches the first preset reference value within the second preset time period. The present disclosure further provides an assisted driving apparatus, an electronic apparatus, a vehicle-mounted system, and a storage medium.

12 Claims, 5 Drawing Sheets

(58) Field of Classification Search
CPC ........... B60W 30/18027; B60W 50/12; B60W 50/14; B60W 2520/10; B60W 2520/06; B60W 2540/10; B60W 2540/18; B60W 2710/182; B60W 2050/143; G01C 21/3469; B60T 2201/022; B60T 2201/081; B60T 2201/087; B60T 17/22; B60T 7/22; B60T 2250/00; B60T 2270/406; Y02T 10/84; B60K 28/02
USPC .................................................. 701/37, 41, 70
See application file for complete search history.

(56) References Cited

U.S. PATENT DOCUMENTS

| | | |
|---|---|---|
| 2019/0315360 A1 | 10/2019 | Kim et al. |
| 2023/0166742 A1 | 6/2023 | Liu |

FOREIGN PATENT DOCUMENTS

| | | | |
|---|---|---|---|
| CN | 106956647 A | 7/2017 | |
| CN | 108583584 A | 9/2018 | |
| CN | 109774595 A | 5/2019 | |
| CN | 109987085 A | 7/2019 | |
| CN | 113815409 A | 12/2021 | |
| EP | 4129733 A1 | 2/2023 | |
| JP | 5136686 * | 2/2013 | ............ B60W 10/04 |
| KR | 20140066301 A | 6/2014 | |
| WO | WO 2021254086 A1 | 12/2021 | |

OTHER PUBLICATIONS

WIPO, International Search Report issued on Aug. 6, 2021.
China Patent Office, first Office action dated Jun. 28, 2024, for corresponding CN application No. 202010556946.1.

* cited by examiner

ASSISTED DRIVING METHOD AND APPARATUS, ELECTRONIC APPARATUS, VEHICLE-MOUNTED SYSTEM, AND STORAGE MEDIUM

CROSS-REFERENCE TO RELATED APPLICATION

The present disclosure is a National Phase Application filed under 35 U.S.C. 371 as a national stage of PCT/CN2021/094945, filed on May 20, 2021, an application claiming the priority to Chinese Patent Application No. 202010556946.1 filed with the CNIPA on Jun. 16, 2020, the entire contents of which are incorporated herein by reference.

TECHNICAL FIELD

The present disclosure relates to the field of communication technology, and particularly relates to an assisted driving method and apparatus, an electronic apparatus, a vehicle-mounted system, and a storage medium.

BACKGROUND

With the improvement of people's living standard, vehicles have become common transportation tools for people. During the driving process of a vehicle, if there is a traffic jam, people often select to change lanes according to traffic conditions of adjacent lanes on the left and right. At this time, the driver usually drives the steering wheel to the right or left to make an opportunistic lane change. When the road ahead suddenly becomes clear, the driver sometimes habitually steps on the accelerator to catch up with a preceding vehicle, but forgets that the current traveling direction of the vehicle is not straight ahead any more. In this case, if there is an adjacent vehicle, it is very likely to collide with the adjacent vehicle, and lead to a traffic accident.

SUMMARY

The present disclosure provides an assisted driving method, including: monitoring, in response to that a driving speed of a vehicle is less than or equal to a preset speed and a steering wheel direction is deflected within a first preset time period, an instantaneous oil consumption value of the vehicle; determining whether the instantaneous oil consumption value of the vehicle reaches a first preset reference value within a second preset time period; and sending a reminding message in response to that the instantaneous oil consumption value of the vehicle reaches the first preset reference value within the second preset time period.

The present disclosure further provides an assisted driving apparatus, including: a monitoring module configured to monitor, in response to that a driving speed of a vehicle is less than or equal to a preset speed and a steering wheel direction is deflected within a first preset time period, an instantaneous oil consumption value of the vehicle; and a reminding module configured to send a reminding message when the monitoring module detects that the instantaneous oil consumption value of the vehicle reaches the first preset reference value within the second preset time period.

The present disclosure further provides an electronic device, including a memory and a processor, where the memory has one or more programs stored thereon, and the processor executes the one or more programs to implement the assisted driving method according to the present disclosure.

The present disclosure further provides a vehicle-mounted system, including the assisted driving apparatus of the present disclosure.

The present disclosure further provides a vehicle-mounted system, including the electronic apparatus of the present disclosure.

The present disclosure further provides a computer-readable storage medium having one or more programs stored thereon which, when executed by one or more processors, cause the one or more processors to implement the assisted driving method of the present disclosure.

DETAIL DESCRIPTION OF EMBODIMENTS

In order to make those skilled in the art better understand the technical solutions of the present disclosure, the following describes the assisted driving method and apparatus, the vehicle-mounted system, and the storage medium of the present disclosure in detail with reference to the accompanying drawings.

Example embodiments will be described more sufficiently below with reference to the accompanying drawings, but which may be embodied in different forms and should not be construed as limited to the embodiments set forth herein. These embodiments are provided so that the present disclosure will be thorough and complete, and will fully convey the scope the present disclosure to those skilled in the art.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements/instructions/requests, these elements/instructions/requests should not be limited by these terms. These terms are merely used to distinguish one element/instruction/request from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

In the existing art, vehicles generally remind a driver of problems encountered during driving through methods such as a preceding vehicle radar or lane changing assistance. However, if the driver suddenly steps on the accelerator for reasons such as emergency, especially for a vehicle with fast acceleration, the driver may find a vehicle on the left or right side but cannot brake in time, leading to collision with the left or right side vehicle.

The assisted driving method of the present disclosure can be used to solve this technical problem, and can be implemented based on an assisted driving apparatus according to the present disclosure.

Figure 1:
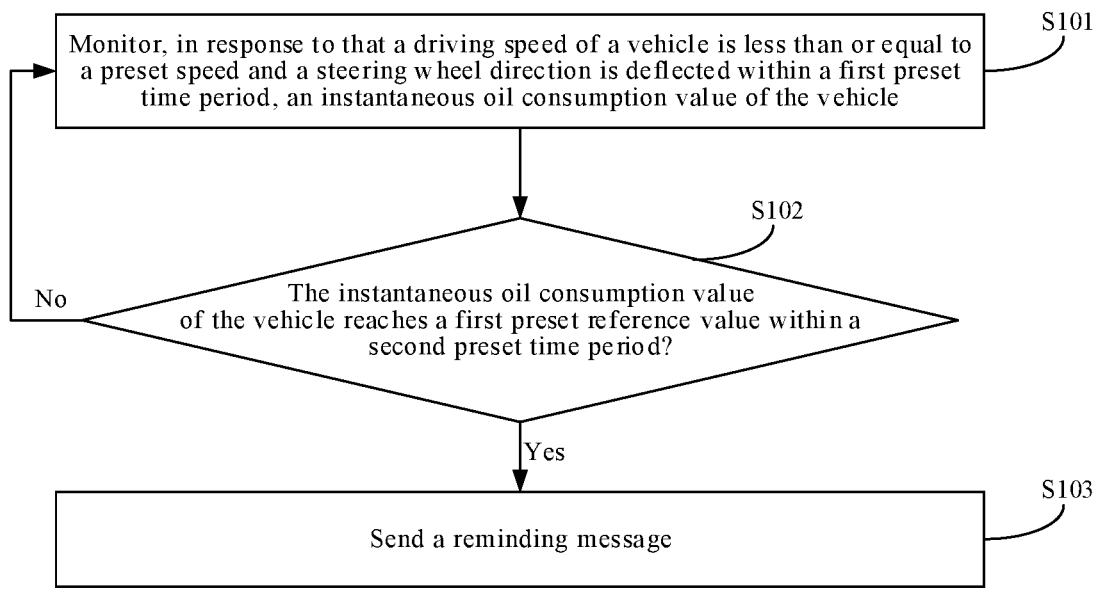
FIG. 1 is a flowchart of an assisted driving method according to the present disclosure.

FIG. 1 is a flowchart of an assisted driving method according to the present disclosure.

As shown in FIG. 1, the assisted driving method of the present disclosure includes operations S101 to S103.

At operation S101, monitoring, in response to that a driving speed of a vehicle is less than or equal to a preset speed and a steering wheel direction is deflected within a first preset time period, an instantaneous oil consumption value of the vehicle.

In the present disclosure, when a driving speed of a vehicle is less than or equal to a preset speed and a steering wheel direction is deflected within a first preset time period, it indicates that the vehicle intends to deviate from a forward direction, for example, to change to another lane during traffic jam, or the like. At this time, by monitoring the instantaneous oil consumption value of the vehicle, an improper operation of the vehicle driver, such as sudden acceleration, can be timely recognized.

The first preset time period and the preset speed may be set according to an actual application scenario. For example, the first preset time period may be 3 seconds, and the preset speed may be 0 or 5 KM/h, and so on. The steering wheel direction being deflected means that a direction of the steering wheel is deflected at a certain angle to the left or right from the forward direction of the vehicle (direction of the head).

At operation S102, determining whether the instantaneous oil consumption value of the vehicle reaches a first preset reference value within a second preset time period.

The second preset time period may be set according to an actual application scenario. For example, the second preset time period is 0.5 seconds. The first preset reference value may be a standard reference value set according to a maximum instantaneous oil consumption value of the vehicle. For example, the first preset reference value may be 50% of the maximum instantaneous oil consumption value of the vehicle.

In operation S102, a sample instantaneous oil consumption value of the vehicle may be acquired at a certain time interval within the second preset time period, and compared with the first preset reference value. If the sample instantaneous oil consumption value reaches the first preset reference value, it indicates that the driver intends to accelerate. At this time, the following operation S103 is performed to remind the driver that the direction of the vehicle steering wheel is now not in the forward direction, and an accident risk will be increased if accelerate. If the sample instantaneous oil consumption value is less than the first preset reference value, it indicates that no fast acceleration of the vehicle will happen, so reminding may be not sent, and return to perform operation S101.

At operation S103, sending a reminding message.

According to the assisted driving method of the present disclosure, when the driving speed of the vehicle is less than or equal to a preset speed and the steering wheel direction is deflected within a certain time period, a reminding message is sent to the driver by monitoring changes in the instantaneous oil consumption value of the vehicle. Therefore, under the condition that the driver forgets that the steering wheel of the vehicle is now deflected and suddenly accelerates, the reminding message can be sent to the driver in time, thereby reducing the occurrence rate of traffic accidents.

Figure 2:
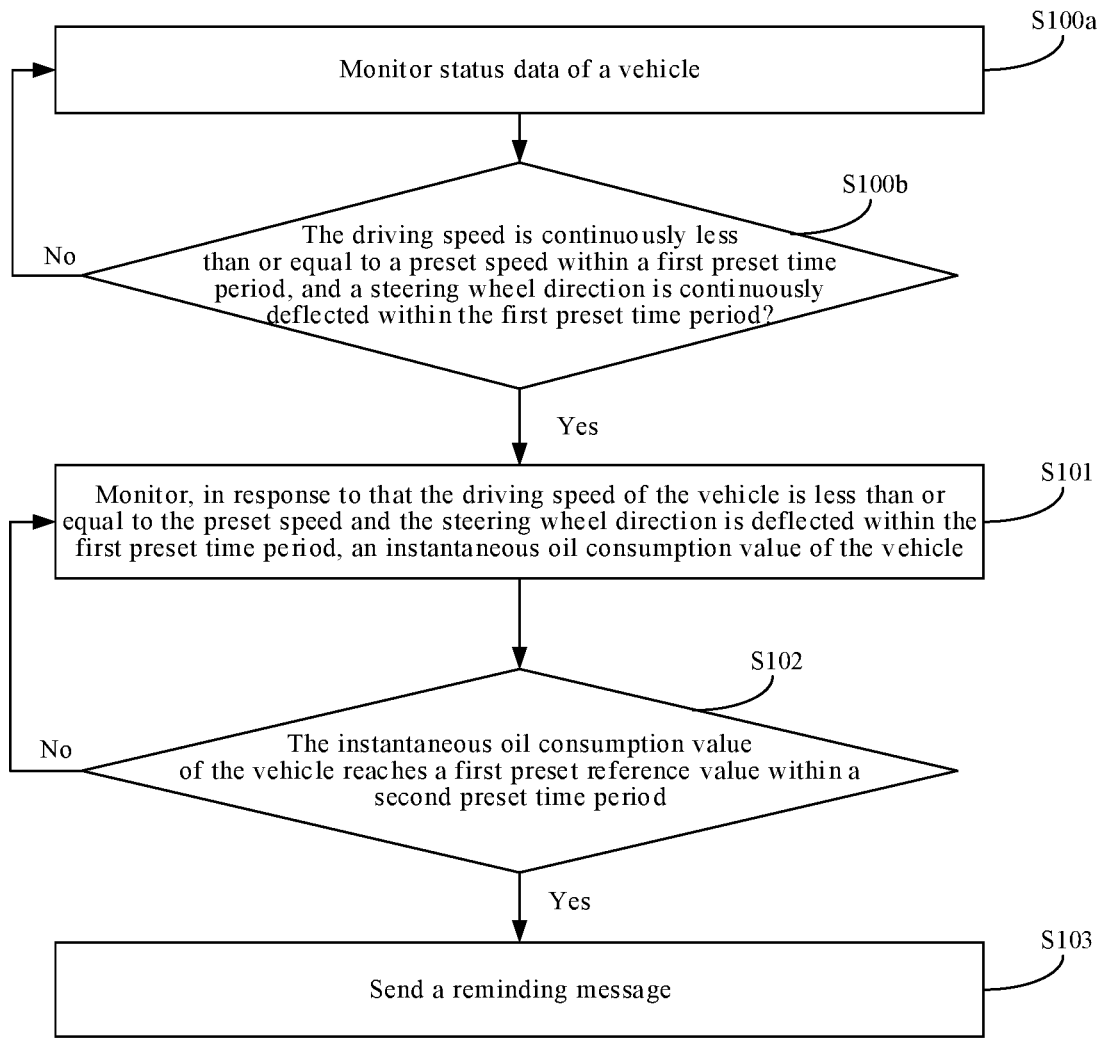
FIG. 2 is another flowchart of an assisted driving method according to the present disclosure.

FIG. 2 is another flowchart of an assisted driving method according to the present disclosure.

As shown in FIG. 2, on the basis of the method shown in FIG. 1 and before operation S101, the method may further include operations S100a to S100b.

At operation S100a, monitoring status data of the vehicle.

At operation S100b, determining whether the driving speed is continuously less than or equal to the preset speed within the first preset time period, and determining whether the steering wheel direction is continuously deflected within the first preset time period.

Whether to monitor the instantaneous oil consumption value of the vehicle may be determined by monitoring status data of the vehicle. The status data may include the driving speed and the steering wheel direction. When it is detected that the driving speed is continuously less than or equal to the preset speed within the first preset time period, and the steering wheel direction is continuously deflected within the first preset time period, it may be determined to further monitor the oil consumption value of the vehicle. In the present disclosure, the status data may be acquired from an electronic control unit (ECU) of the vehicle through a controller area network (CAN), an on-board Ethernet network, or any other vehicle internal communication network, or may be acquired by operating different vehicle network protocol stacks simultaneously or by communicating with a micro controller unit (MCU). The acquisition interval during monitoring of the data may be a minimum cycle of signal value specified in the vehicle network protocol stack.

Figure 3:
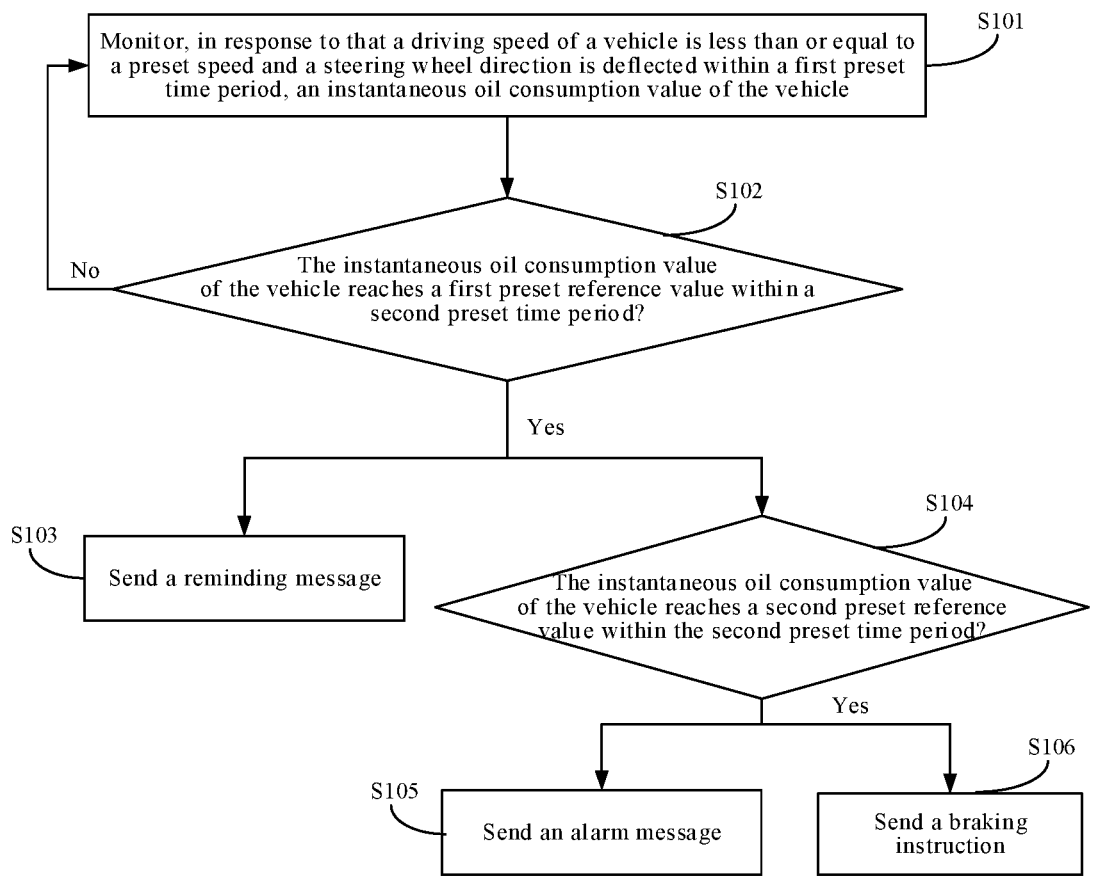
FIG. 3 is another flowchart of an assisted driving method according to the present disclosure.

FIG. 3 is another flowchart of an assisted driving method according to the present disclosure.

As shown in FIG. 3, on the basis of the method shown in FIG. 1 and after operation S102, the method may further include operations S104 to S106.

At operation S104, determining whether the instantaneous oil consumption value of the vehicle reaches a second preset reference value within the second preset time period.

If the instantaneous oil consumption value of the vehicle reaches the second preset reference value within the second preset time period, operations S105 and S106 are performed.

At operation S105, sending an alarm message.

At operation S106, sending a braking instruction.

The second preset reference value may be greater than the first preset reference value, and has the same basic meaning as the first preset reference value, i.e., a standard reference value set according to a maximum instantaneous oil consumption value of the vehicle. The second preset reference value may be 70% of the maximum instantaneous oil consumption value of the vehicle.

In operation S104, similar to operation S102, when the instantaneous oil consumption value of the vehicle reaches the first preset reference value within the second preset time period, the instantaneous oil consumption value of the vehicle is further compared with the second preset reference value. If the instantaneous oil consumption value of the vehicle reaches the second preset reference value, it indicates that the driver is accelerating too fast, and operations S105 and operation S106 are to be performed. On one hand, an alarm message is sent to the driver to warn the driver that the current driving behavior is very dangerous, and on the other hand, a braking instruction is sent to the vehicle's ECU to assist in emergency braking of the vehicle.

It should be noted that although both the alarm message and the reminding message both may play a role in prompting the vehicle driver, the contents of the two may be different. Since the alarm message and the reminding message correspond to different scenarios, the content of the alarm message should be more noticeable to the driver. For example, the alarm message may have a higher sound frequency than the reminding message, so as to be more noticeable to the driver.

Figure 4:
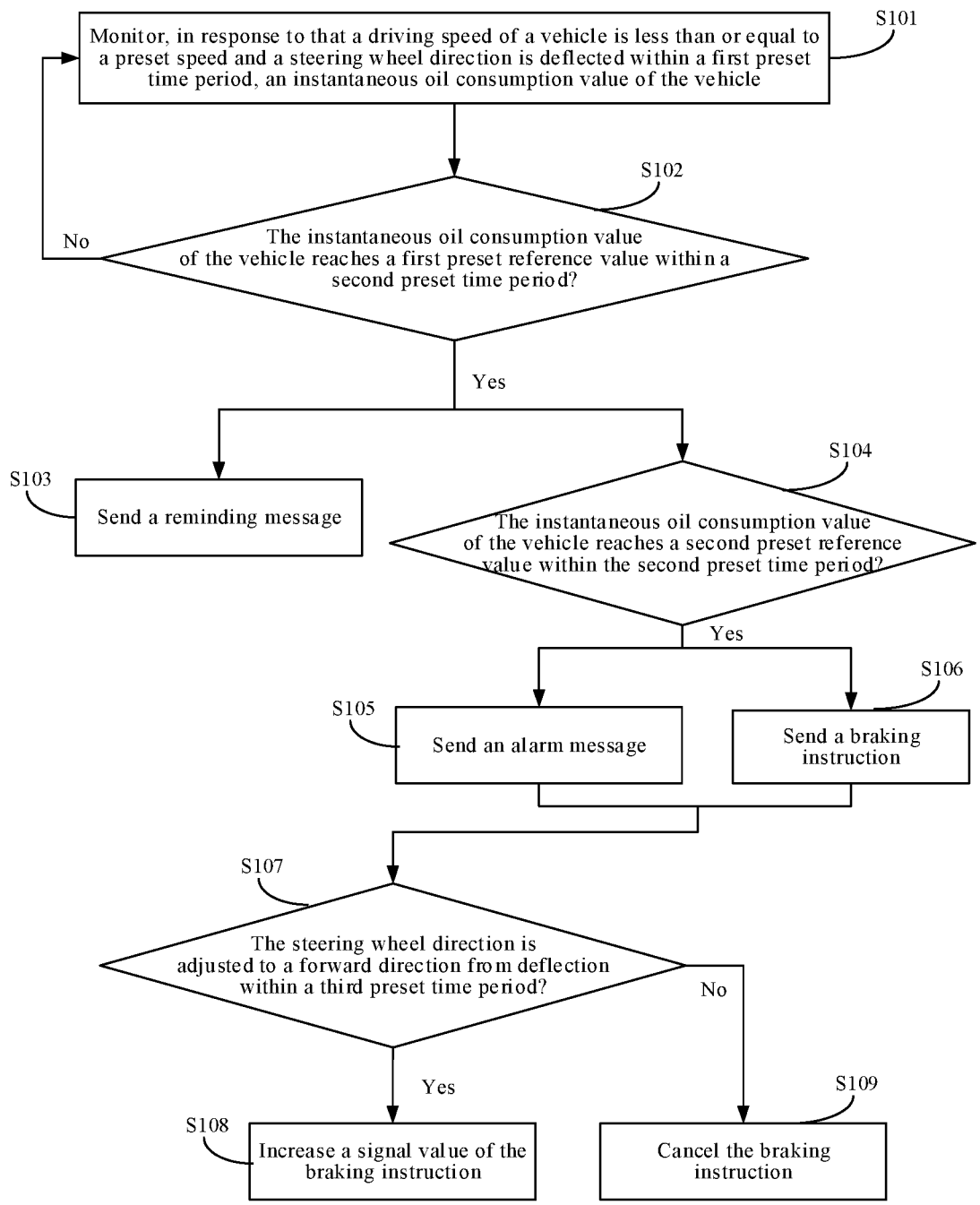
FIG. 4 is another flowchart of an assisted driving method according to the present disclosure.

FIG. 4 is another flowchart of an assisted driving method according to the present disclosure.

As shown in FIG. 4, on the basis of the method shown in FIG. 3 and after operations S105 and S106, the method may further include operations S107 to S109.

At operation S107, determining whether the steering wheel direction is adjusted to a forward direction from deflection within a third preset time period.

If the steering wheel direction is adjusted to the forward direction from deflection within the third preset time period, the following operation S108 is performed. If the steering wheel direction is not adjusted to the forward direction from deflection within the third preset time period, operation S109 is performed.

At operation S108, increasing a signal value of the braking instruction.

At operation S109, cancelling the braking instruction.

After the alarm message and the braking instruction are sent, whether the steering wheel of the vehicle is adjusted to the forward direction from deflection within the third preset time period can be further monitored. The third preset time period is set according to an actual application scenario. For example, the third preset time period is 0.5 seconds.

When the steering wheel of the vehicle is adjusted to the forward direction from deflection within the third preset time period, it indicates that the driver has noticed that the current steering wheel direction is not the forward direction, and then, the brake signal value is increased to assist the driver to decelerate or brake the vehicle. When the steering wheel of the vehicle does not have a trend to return to the forward direction within the third preset time period, it indicates that the driver wants to continue to move forward in the deflected direction, and then, the brake signal is cancelled, so as not to obstruct normal driving of the driver.

Figure 5:
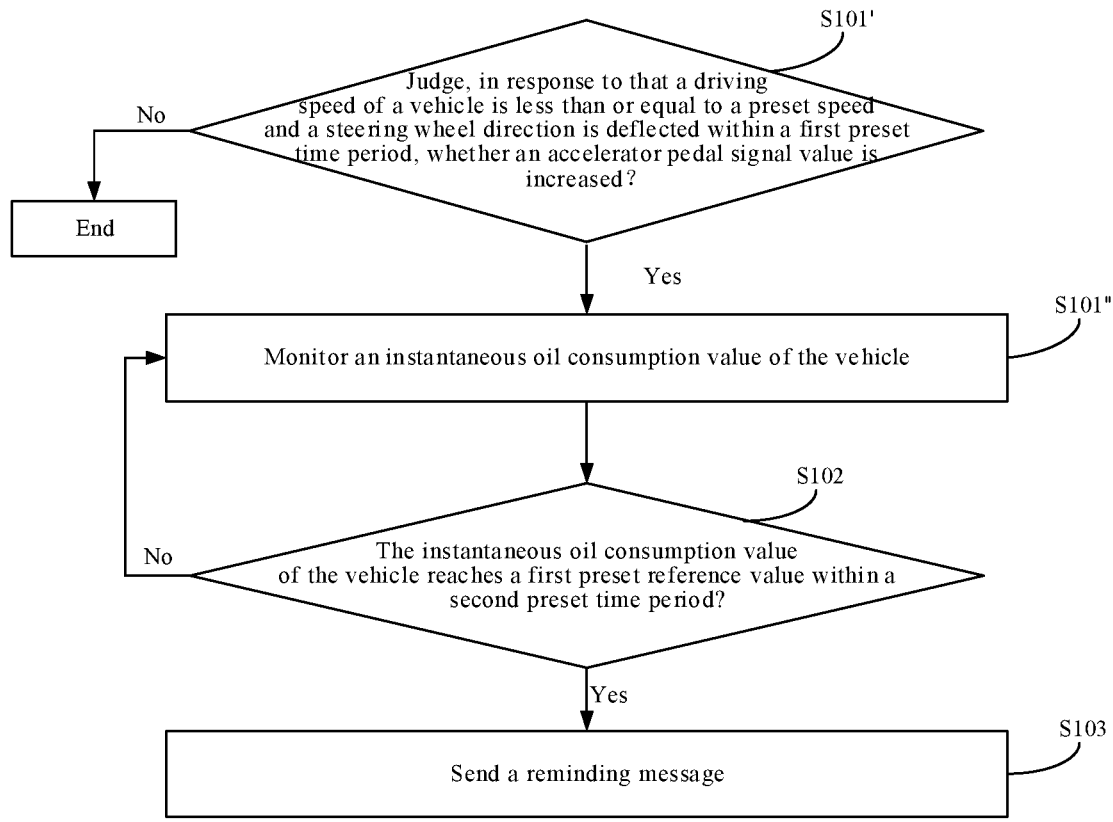
FIG. 5 is another flowchart of an assisted driving method according to the present disclosure.

FIG. 5 is another flowchart of an assisted driving method according to the present disclosure.

As shown in FIG. 5, on the basis of the method shown in FIG. 1, operation S101 may include operations S101' and S101".

At operation S101', determining, in response to that the driving speed of the vehicle is less than or equal to the preset speed and the steering wheel direction is deflected within the first preset time period, whether an accelerator pedal signal value is increased.

Before monitoring the instantaneous oil consumption value of the vehicle, an accelerator pedal signal value of the vehicle may be firstly monitored. When the accelerator pedal signal value is increased, it indicates that the driver wants to start accelerating, and then, operation S101" can be further performed to monitor the instantaneous oil consumption value of the vehicle and take corresponding assisted driving measures according to the instantaneous oil consumption value of the vehicle. By detecting the accelerator pedal signal value to determine whether to further analyze the instantaneous oil consumption value of the vehicle, the processing flow of assisted driving can be accelerated, so as to avoid speed reduction of the processing flow caused by directly analyzing the instantaneous oil consumption value of the vehicle.

The pedal signal may be acquired in the same manner as the driving speed and the steering wheel direction, i.e., may be acquired from the ECU of the vehicle through the CAN or on-board Ethernet network or any other vehicle internal communication network.

At operation S101", monitoring an instantaneous oil consumption value of the vehicle.

Figure 6:
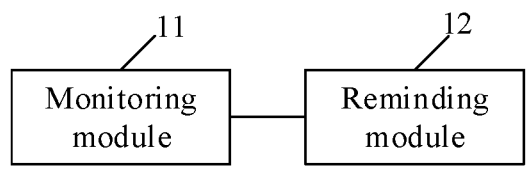
FIG. 6 is a schematic structural diagram of an assisted driving apparatus according to the present disclosure.

FIG. 6 is a schematic structural diagram of an assisted driving apparatus according to the present disclosure.

As shown in FIG. 6, the assisted driving apparatus of the present disclosure includes a monitoring module 11 and a reminding module 12. The monitoring module 11 is configured to monitor, in response to that a driving speed of a vehicle is less than or equal to a preset speed and a steering wheel direction is deflected within a first preset time period, an instantaneous oil consumption value of the vehicle. When the monitoring module 11 detects that the instantaneous oil consumption value of the vehicle reaches a first preset reference value within a second preset time period, the reminding module 12 sends a reminding message.

The assisted driving apparatus provided in the present disclosure may be used to implement the assisted driving method described above with reference to FIG. 1 of the present disclosure, and detailed description of functional modules of the assisted driving apparatus may refer to the description of corresponding method operations in the method shown in FIG. 1, which is not repeated here.

According to the assisted driving apparatus of the present disclosure, when the driving speed of the vehicle is less than or equal to a preset speed and the steering wheel direction is deflected within a certain time period, a reminding message is sent to the driver by monitoring changes in the instantaneous oil consumption value of the vehicle. Therefore, under the condition that the driver forgets that the steering wheel of the vehicle is now deflected and suddenly accelerates, a reminding message can be sent to the driver in time, thereby reducing the occurrence rate of traffic accidents.

The present disclosure further provides a vehicle-mounted system, including the assisted driving apparatus of the present disclosure.

The present disclosure further provides an electronic apparatus, including a memory and a processor. The memory has one or more programs stored thereon, and the processor executes the one or more programs to implement the assisted driving method according to the present disclosure.

The present disclosure further provides a vehicle-mounted system, including the electronic apparatus of the present disclosure.

The present disclosure further provides a computer-readable storage medium having one or more programs stored thereon which, when executed by one or more processors, cause the one or more processors to implement the assisted driving method of the present disclosure.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). The term computer storage medium includes volatile and nonvolatile, removable and non-removable media implemented in any method or technology for storage of information such as computer-readable instructions, data structures, program modules or other data, as is well known to those of ordinary skill in the art. The computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. An assisted driving method, comprising:
   monitoring, in response to that a driving speed of a vehicle is less than or equal to a preset speed and a steering wheel direction is deflected within a first preset time period, an instantaneous oil consumption value of the vehicle;
   determining whether the instantaneous oil consumption value of the vehicle reaches a first preset reference value within a second preset time period; and
   sending a reminding message in response to that the instantaneous oil consumption value of the vehicle reaches the first preset reference value within the second preset time period.

2. The method according to claim 1, wherein before monitoring,
   in response to that the driving speed of the vehicle is less than or equal to the preset speed and the steering wheel direction is deflected within the first preset time period, the instantaneous oil consumption value of the vehicle, the method further comprises:
   monitoring status data of the vehicle, comprising the driving speed and the steering wheel direction;
   determining whether the driving speed is continuously less than or equal to the preset speed within the first preset time period; and
   determining whether the steering wheel direction is continuously deflected within the first preset time period.

3. The method according to claim 2, wherein the status data is acquired from an electronic control unit of the vehicle via a controller area network or an on-board Ethernet network.

4. The method according to claim 1, further comprising:
   determining whether the instantaneous oil consumption value of the vehicle reaches a second preset reference value within the second preset time period; and
   sending, in response to that the instantaneous oil consumption value of the vehicle reaches the second preset reference value within the second preset time period, an alarm message and sending a braking instruction,
   wherein the second preset reference value is greater than the first preset reference value.

5. The method according to claim 4, wherein after sending the alarm message and sending the braking instruction, the method further comprises:
   determining whether the steering wheel direction is adjusted to a forward direction from deflection within a third preset time period; and
   increasing, in response to that the steering wheel direction is adjusted from deflection to the forward direction within the third preset time period, a signal value of the braking instruction.

6. The method according to claim 5, further comprising:
   cancelling the braking instruction in response to that the steering wheel direction is not adjusted from deflection to the forward direction within the third preset time period.

7. The method according to claim 1, wherein monitoring, in response to that the driving speed of the vehicle is less than or equal to the preset speed and the steering wheel direction is deflected within the first preset time period, the instantaneous oil consumption value of the vehicle comprises:
   determining, in response to that the driving speed of the vehicle is less than or equal to the preset speed and the steering wheel direction is deflected within the first preset time period, whether an accelerator pedal signal value is increased; and
   monitoring, in response to an increased accelerator pedal signal value, the instantaneous oil consumption value of the vehicle.

8. An electronic apparatus, comprising a memory and a processor, wherein the memory has one or more programs stored thereon, and the processor executes the one or more programs to implement the assisted driving method according to claim 1.

9. A vehicle-mounted system, comprising the electronic apparatus according to claim 8.

10. A storage medium having one or more programs stored thereon which, when executed by one or more processors, cause the one or more processors to implement the assisted driving method according to a claim 1.

11. An assisted driving apparatus, comprising:
    a monitoring module configured to monitor, in response to that a driving speed of a vehicle is less than or equal to a preset speed and a steering wheel direction is deflected within a first preset time period, an instantaneous oil consumption value of the vehicle; and a reminding module configured to send a reminding message when the monitoring module detects that the instantaneous oil consumption value of the vehicle reaches the first preset reference value within the second preset time period.

12. A vehicle-mounted system, comprising the assisted driving apparatus according to claim 11.

* * * * *